United States Patent [19]

Fukaya et al.

[11] Patent Number: 5,536,218
[45] Date of Patent: Jul. 16, 1996

[54] REDUCTION GEAR WITH ECCENTRIC BODY

[75] Inventors: Sueo Fukaya; Shigeo Watanabe, both of Ohbu, Japan

[73] Assignee: Sumitomo Heavy Industries, Ltd., Tokyo, Japan

[21] Appl. No.: 332,769

[22] Filed: Nov. 1, 1994

[30] Foreign Application Priority Data

Nov. 10, 1993 [JP] Japan .................................. 5-280886

[51] Int. Cl.⁶ ...................................... F16H 1/32
[52] U.S. Cl. ...................... 475/178; 74/DIG. 10
[58] Field of Search ........................ 475/178; 74/DIG. 10

[56] References Cited

U.S. PATENT DOCUMENTS

| | | | |
|---|---|---|---|
| 3,894,507 | 7/1975 | Koechlin | 475/178 |
| 4,484,496 | 11/1984 | Weis | 475/178 |
| 5,269,733 | 12/1993 | Anthony, III | 74/DIG. 10 |
| 5,402,207 | 3/1995 | Michlin | 355/200 |

*Primary Examiner*—Charles A. Marmor
*Assistant Examiner*—Sherry Estremsky
*Attorney, Agent, or Firm*—Nikaido Marmelstein Murray & Oram

[57] ABSTRACT

A reduction gear mechanism applicable for a geared motor used for lifters for business equipment or the like. A trochoid tooth profile internally meshing type planetary reduction gear mechanism is used as the basic reduction gear mechanism. Each of an external gear and an internal gear is formed of a resin having a small rigidity. Each of an output shaft and a bearing supporting the external gear is formed of a metal having a large rigidity. As a result, the reduction mechanism ensures the rigidity and rotational smoothness in usual operation. Moreover, when a torque more than a value required for a mating member to be driven is applied, the external gear and internal gear are deformed, resulting in the increased meshing loss. The reduction mechanism can reduce the efficiency mechanically by the increase in the meshing loss. Even if a reversing load is applied from the output shaft side, the efficiency can be also reduced by the same meshing loss. Namely, there can be obtained a reduction gear provided with an overload preventive function or reverse rotation preventive function without addition of any special mechanism.

4 Claims, 6 Drawing Sheets

● : TEETH MESHING WITH EACH OTHER WHEN RATING LOAD IS APPLIED

● + ▲ : TEETH MESHING WITH EACH OTHER WHEN STALL TORQUE IS APPLIED

● : TEETH MESHING WITH EACH OTHER WHEN RATING LOAD IS APPLIED

● + ▲ : TEETH MESHING WITH EACH OTHER WHEN STALL TORQUE IS APPLIED

REDUCTION GEAR WITH ECCENTRIC BODY

BACKGROUND OF THE INVENTION

1. Field of the Invention

The present invention relates to a reduction gear suitable for lifters of business equipment such as copying machines.

2. Description of the Prior Art

FIGS. 4 and 5 show an apparatus used for business equipment such as copying machines. The apparatus is a combination of a reduction gear having paired involute gears with parallel axes, and a motor.

In this apparatus, the output of a motor 100 is taken from an output shaft 104 by way of five steps of involute gear rows 102A to 102E. The output characteristic is shown by the solid line in FIG. 6.

In general, the reduction mechanism used for lifters of business equipment such as copying machines requires the following functions: i) no-load rotational frequency A; ii) rating load rotational frequency B; iii) rating torque C; and iv) stall torque D, which are for example shown by black dots and broken lines in FIG. 6. The reduction mechanism further requires a reverse rotation preventive function, that is, the function of holding the position of the output shaft 104.

The above-described reduction gear using involute gear rows, however, cannot sufficiently satisfy the above functions. For example, to satisfy the function of the stall torque described in iv), that is, to satisfy the characteristic of preventing the output of a torque over a specified value for protecting a mating member, the involute reduction gear must be additionally provided with an overload preventive apparatus such as a torque limiter mechanism or overcurrent protective mechanism. Moreover, in the involute gear reduction gear, the start-up efficiency from the output side is high (positive value), and accordingly, when a load more than a specified value is applied to the output side, the output shaft is reversely rotated. Accordingly the output shaft cannot be held in its position. In this regard, to hold the position of the output shaft 104, that is, to prevent the reverse rotation of the output shaft 104, the involute reduction gear is additionally provided with a mechanism for holding the position of the output shaft or preventing the reverse rotation thereof.

As described above, the prior art reduction gear using involute gear rows is necessarily provided with additional mechanisms when used for business equipment requiring the stall torque characteristic and the function of preventing the reverse rotation. Consequently, there is a difficulty in reducing the size, weight and cost of the prior art reduction gear used for business equipment.

SUMMARY OF THE INVENTION

An object of the present invention is to provide a reduction gear being excellent in reduction efficiency at usual operation, and further having a suitable stall torque characteristic and a function of preventing the reverse rotation of the output shaft without addition of any special mechanism.

The present invention solves the problems by the reduction gear for business equipment, which has an internally meshing type planetary reduction gear mechanism in a casing, comprising: an eccentric body rotated by the output of a motor; an external gear made of a resin, which is rockingly rotated around said eccentric body; an internal gear made of a resin, which is fixed on said casing and internally meshes with said external gear made of a resin; component selectively taking out means for absorbing the rocking component of said external gear and taking out only the rotational component of said external gear; an output shaft connected to said external gear through said component selectively taking out means, and which is formed of a metal having a rigidity higher than that of the resin forming said external gear and said internal gear; and a bearing disposed between said eccentric body and said external gear, and which is formed of a metal having a large rigidity.

As a preferable embodiment, the bearing of the eccentric body is composed of a sliding bearing formed of a metal ring.

And as other preferable embodiment, the eccentric body is formed integrally with the gear for transmitting the output of a motor, and is disposed around the output shaft.

The present invention is intended to obtain a suitable stall torque characteristic and a function of preventing the reverse rotation of the output shaft without addition of any special mechanism. For this purpose, the so-called internally meshing type planetary reduction gear mechanism is used as a basic reduction mechanism.

This reduction mechanism includes an eccentric body rotated by the output of a motor; an external gear rockingly rotated around the eccentric body; an internal gear fixed on a casing and internally meshing with the external gear; and an output shaft connected to the external gear by way of a means of absorbing the rocking component of the external gear and taking out the rotational component thereof. The basic construction of this reduction mechanism itself has been well known.

In the present invention, the above internally meshing type planetary reduction gear mechanism is used as the reduction gear for business equipment. Furthermore, in the members of the reduction mechanism, each of the external gear and the internal gear is formed of a resin such as a plastic having a low rigidity (liable to be elastically deformed). On the other hand, the output shaft is formed of a metal having a rigidity larger than that of the above resin. A bearing, which is made of a metal having a large rigidity, is disposed between the eccentric body and the external gear.

When an excessive load is applied to the reduction mechanism, the external gear and internal gear are elastically deformed, and the number of the teeth meshing with each other is increased. This increases the meshing loss, thereby lowers the output so that a suitable stall torque characteristic can be ensured without addition of any special mechanism such as a limiter mechanism.

The internally meshing type planetary reduction gear mechanism itself is originally difficult to be reversely rotated by a load from the output shaft side because of the very high reduction ratio thereof. In addition to such a structure, according to the present invention, each of the external gear and the internal gear is formed of a material liable to be easily deformed, so that the meshing portions between the external gear and the internal gear are deformed and stacked even if a load is applied from the output shaft side. Therefore, it becomes possible to obtain the function of preventing the reverse rotation, that is, of holding the position without addition of any special mechanism.

Conventionally, the internally meshing type planetary reduction gear mechanism wholly molded of a resin such as a plastic has been used for applications other than business equipment. However, in the case where the reduction gear of this type is used for business equipment, there occurs the following inconveniences. When a large load is applied to the output shaft by an operator, the components made of resin cannot withstand the load because of the poor strength. Moreover, the rotational resistance between the members, particularly, rotational/sliding resistance between the eccentric body and the external gear is excessively increased, thus reducing the efficiency.

In the present invention, each of the external gear and the internal gear is formed of resin. However, the output shaft as an essential (central) part for assembling the reduction gear is formed of a metal having a large rigidity, and a bearing made of a metal is disposed between the eccentric body and the external gear. As a result, the above-described problems can be all solved.

Additionally, in the present invention, members excluding the external gear, internal gear, output shaft, bearing disposed between the eccentric body and the external gear, are not limited in terms of material, and may be formed of suitable materials in accordance with the concrete applications.

As described above, according to the present invention, the overload preventive function or a reverse rotation preventive function can be realized without addition of any special mechanism, and the power transmission with a high reduction ratio in the usual operation can be efficiently achieved with a compact structure. Therefore, the present invention is very effective to obtain a reduction gear suitable for lifters of business equipment or the like.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

Figure 1:
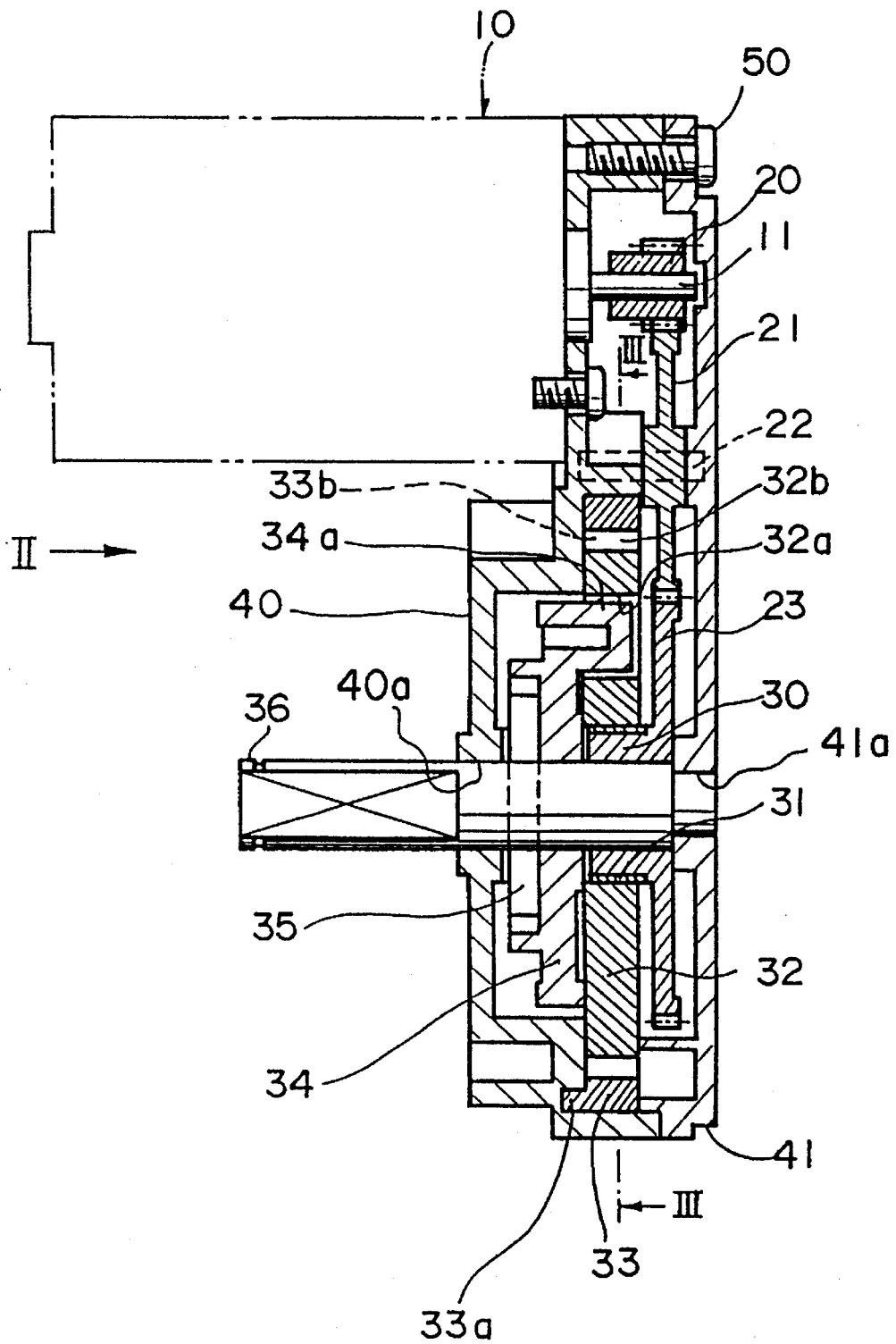
FIG. 1 is a sectional view of a geared motor for business equipment using an internally meshing type planetary reduction gear mechanism of the present invention.
Figure 2:
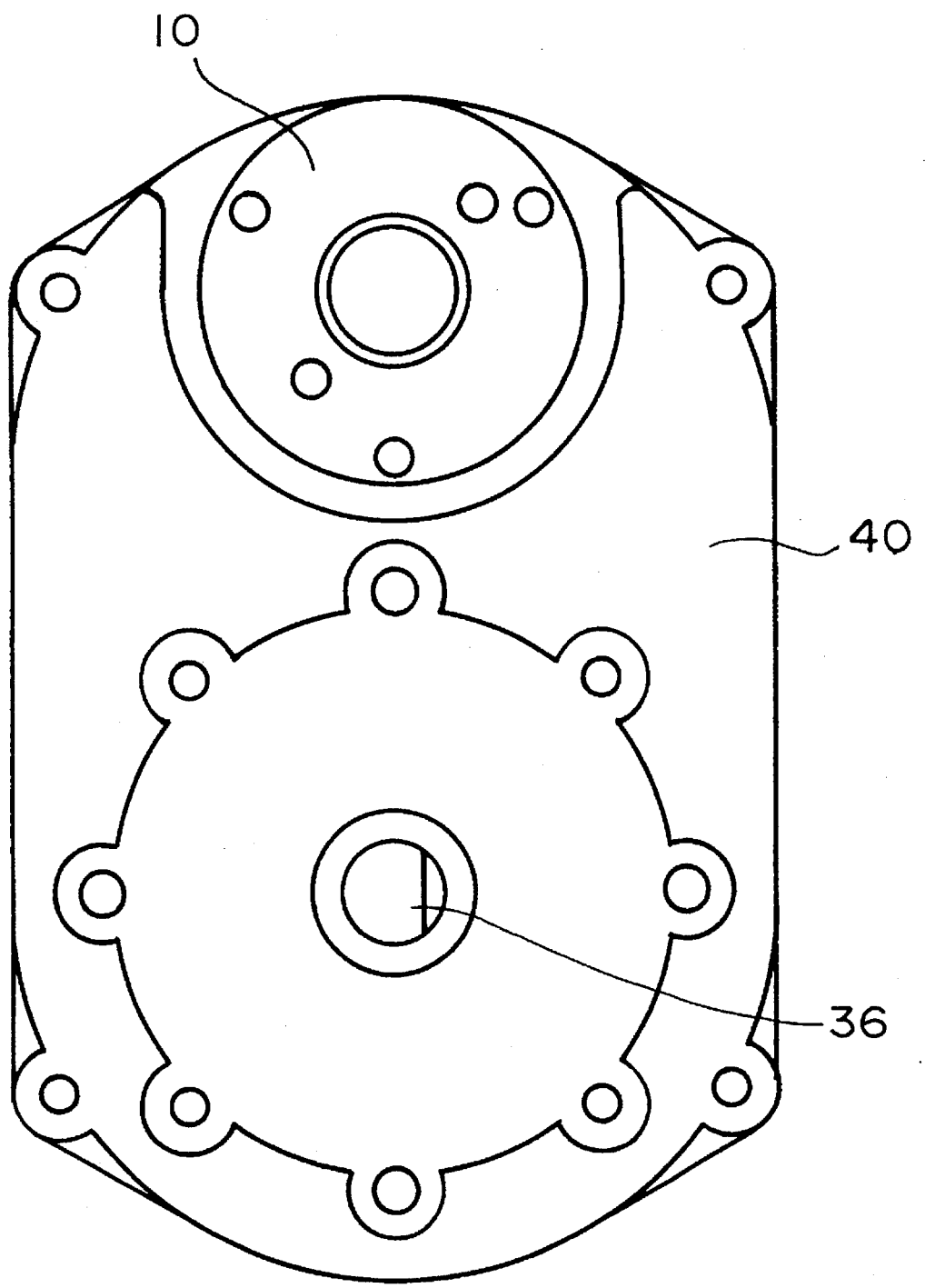
FIG. 2 is a side view of the geared motor of FIG. 1 as seen from the arrow II of FIG. 1.
Figure 3:
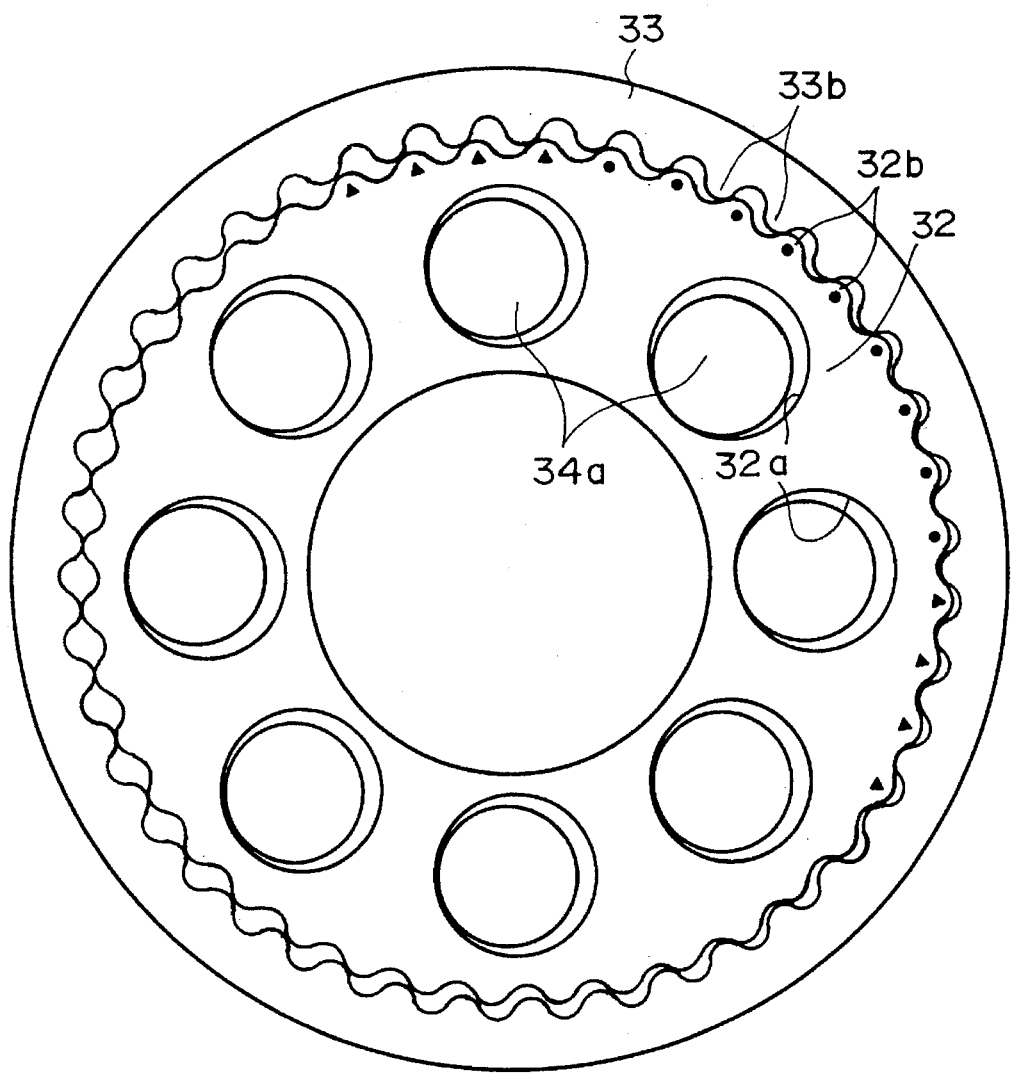
FIG. 3 is an enlarged sectional view taken along line III—III of FIG. 1 for explaining the meshing state between an external gear and an internal gear.
Figure 4:
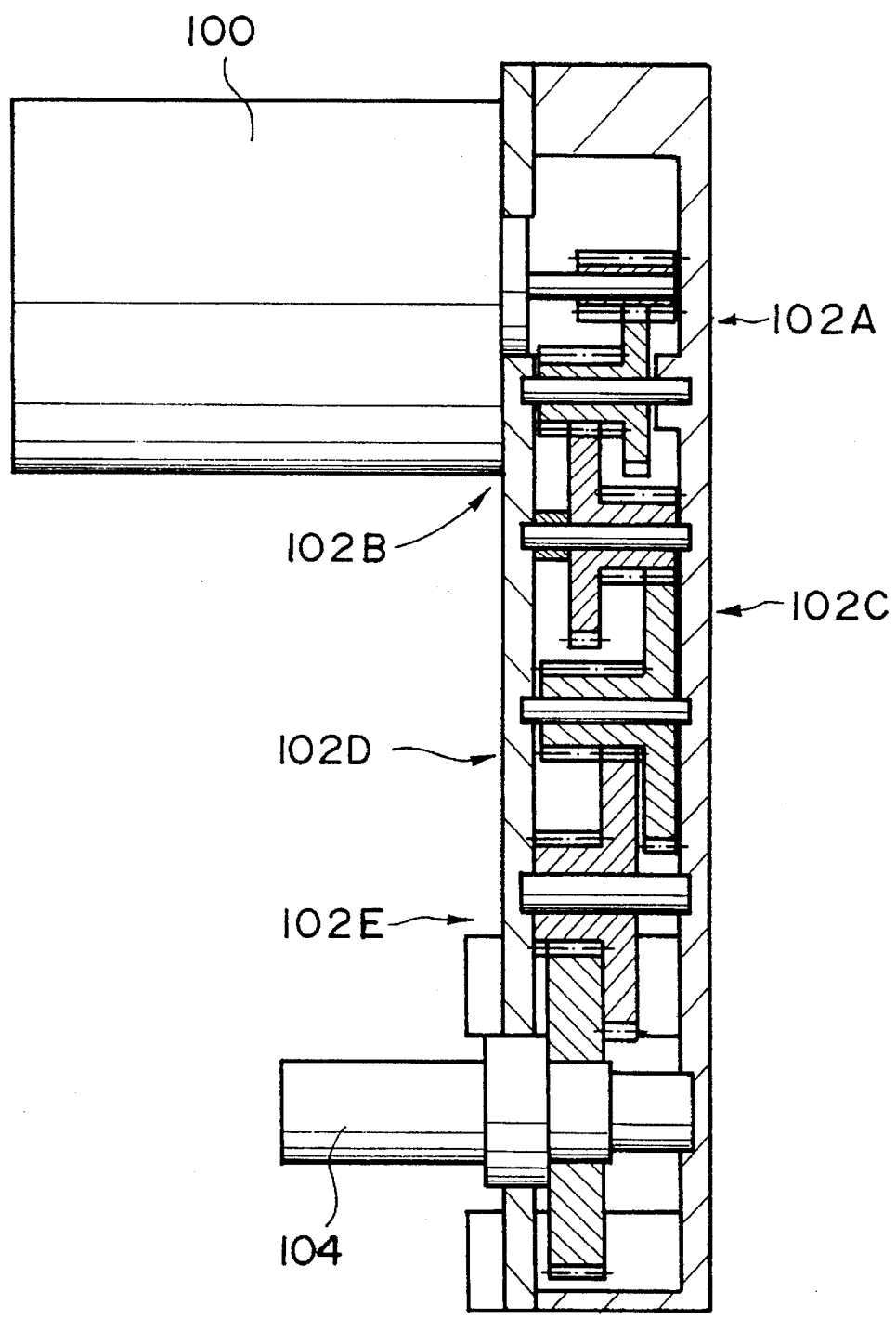
FIG. 4 is a sectional view showing an example of a prior art geared motor for business equipment.
Figure 5:
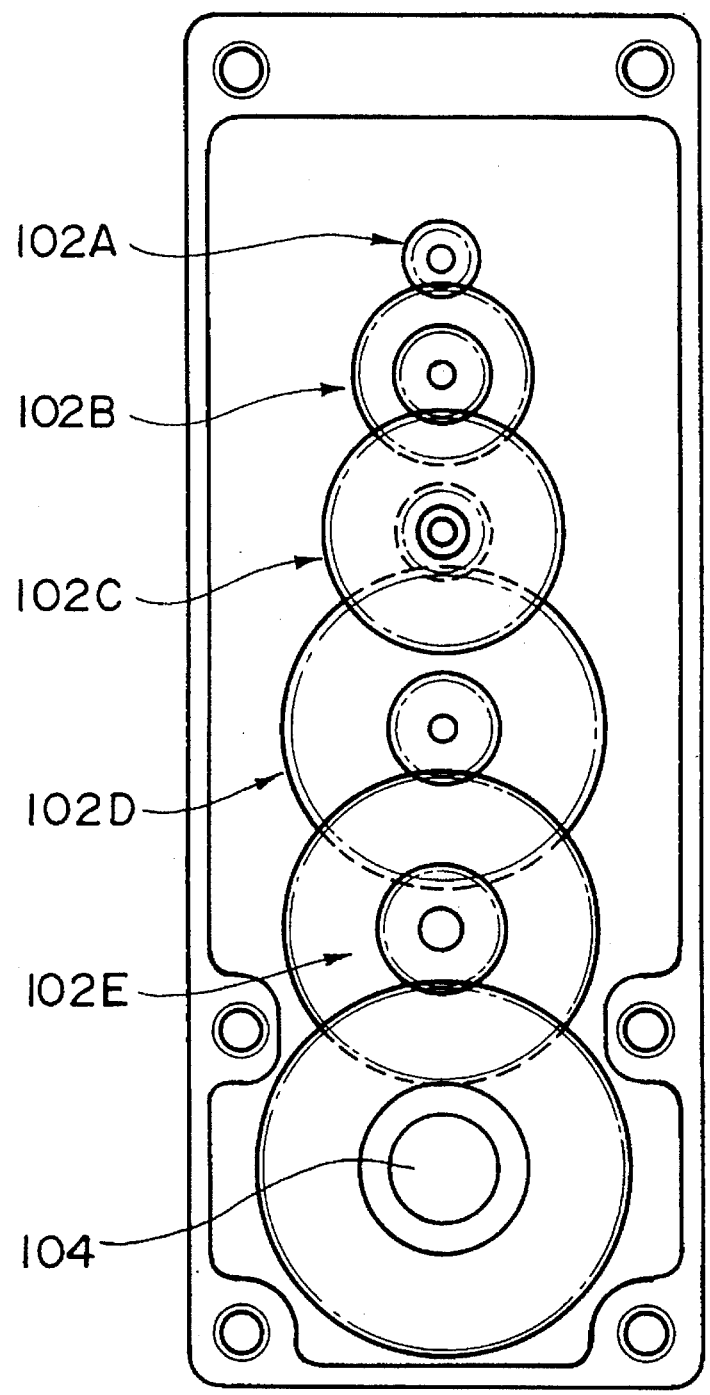
FIG. 5 is a side view of the reduction gear mechanism portion of FIG. 4 as seen from the arrow VI.
Figure 6:
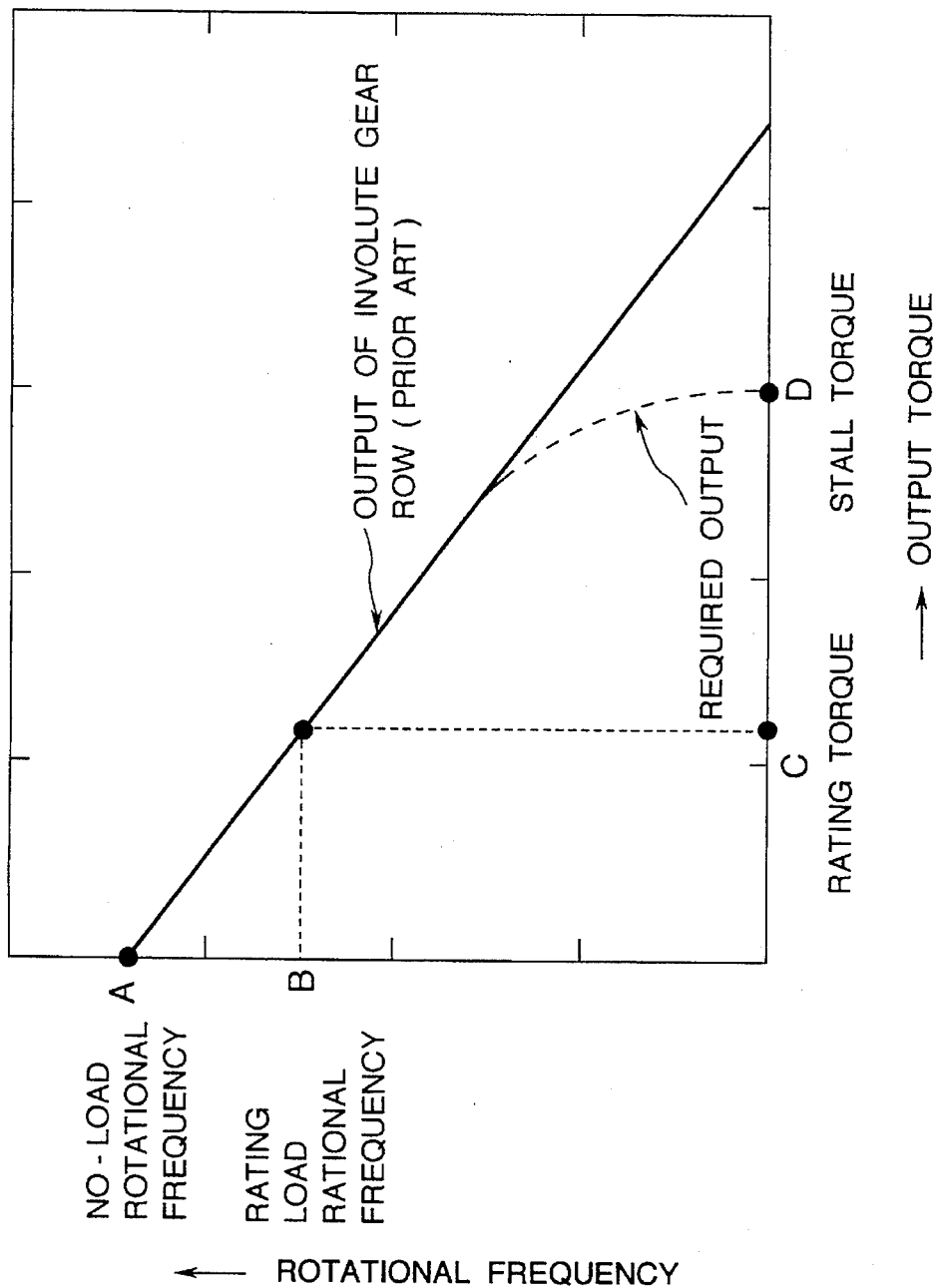
FIG. 6 is a diagram showing the characteristics required for a reduction gear for business equipment.

Hereinafter, an embodiment of the present invention will be described in detail with reference to the drawings. FIGS. 1 to 3 show a geared motor embodying the present invention.

In FIG. 1, a pinion gear 20 is provided around a motor shaft 11 of a motor 10. The pinion gear 20 meshes with an intermediate gear 21 rotatably supported by a pin 22. The intermediate gear 21 meshes with a gear 23 rotatably incorporated around an output shaft 36. The gear 23 is integrated with an eccentric body 30. With this arrangement, the eccentric body 30 is rotated around the output shaft 36 by the rotation of the gear 23.

An external gear 32 is mounted around the outer periphery of the eccentric body 30 by way of a sliding bearing (metal ring) 31 made of metal. The external gear 32a has a plurality of internal pin holes 32 passing through the external gear 32 in the axial direction. External teeth 32b having a trochoid tooth profile and meshing with the internal gear 33 are provided around the outer periphery of the external gear 32.

The internal gear 33 includes internal teeth 33b. The internal teeth 33b has a circular-arc tooth profile and internally meshes with the external teeth 32b of the external gear 32. The internal gear 33 is fixed on a casing 40 by way of a locking piece 33a.

Each of the external gear 32 and the internal gear 33 is formed of a plastic (resin) having a low rigidity (liable to be easily deformed).

On the other hand, a pin flange 34 is fixed on the output shaft 36 by way of a spring pin 35. Pins 34a, which are adapted to be freely fitted in the internal pin holes 32a of the external gear 32, are formed integrally with the pin flange 34 so as to project therefrom. The output shaft 36 is rotatably supported in holes 41a and 40a respectively formed in the casings 41 and 40.

The output shaft 36 is formed of a metal having a large rigidity.

The casing 40 is fixed to the casing 41 by means of a machine screw 50 or the like, and which is fixed to a mating member.

The function of the embodiment will be described below. As the motor shaft 11 of the motor 10 is rotated, the gear 23 is rotated while being reduced in the rotational frequency around the output shaft 36 through the pinion gear 20 and the intermediate gear 21. The eccentric body 30 integrated with the gear 23 is also rotated at the same rotational frequency.

The external gear 32 is intended to be rockingly rotated around the output shaft 36 (around the eccentric body 30) by the rotation of the eccentric body 30. However, since the rotation is restricted by the internal gear 33 fixed on the casing 40, the external gear 32 is substantially rocked while meshing with the internal gear 33.

Letting N be the number of teeth of the external gear 32, and (N+1) be the number of the teeth of the internal gear 33, then the difference in the number of teeth therebetween becomes 1. Accordingly, each time the eccentric body 30 takes one round, the external gear 32 is shifted (rotated on its axis) by one tooth relative to the internal gear 33 fixed to the casing 40. This means that one rotation of the eccentric body 30 is reduced into the –1/N rotation of the external gear 32 (character "–" represents the reverse rotation).

As for the rocking rotation of the external gear 32, the rocking component is absorbed by the gaps between the internal pin holes 32a and the internal pins 34a, and only the rotational component is transmitted to the pin flange 34 by way of the internal pins 34a. Since the pin flange 34 is fixed on the output shaft 36 through the spring pin 35, the –1/N rotation of the external gear 32 is eventually taken from the output shaft 36.

In the present embodiment, each of the external gear 32 and the internal gear 33 is formed of a material having a small elastic modulus (liable to be deformed, or low in rigidity). When a torque more than that required for the mating machine to be driven is applied, as the applied load is increased, the amount of elastic deformation of the external gear 32 and the internal gear 33 is increased, and the number of teeth meshing with each other is increased (●→●+▲, in FIG. 3). As a result, the meshing positions of teeth are shifted, that is, the meshing pressure angle is changed, so that the meshing loss is increased. Thus, the geared motor can be designed to be reduced in its efficiency with an increase in the load using the above function. Therefore, it becomes possible to obtain the so-called stall torque characteristic (overload preventive function), namely the function of preventing the output of the torque more than a specified value, without addition of any special mechanism such as a limiter mechanism.

In the case where a load rotating the output shaft 36 is accidentally applied from the side of the output shaft 36, the elastic deformation is generated between the external gear 32 and the internal gear 33 depending on the applied load, so that the motor is prevented from being reversely rotated by the load of the output shaft 36. Thus, there can be realized the mechanism of holding the stop position of the output shaft 36 (reverse rotation preventive function).

As for the overload preventive function or the reverse rotation preventive function, the effect is further ensured by the fact that the external gear 32 is supported by the sliding bearing made of a metal ring. Namely, when the axial line of the external gear 32 is slightly tilted relative to the axial line of the output shaft 36 or the eccentric body 30 by the deformation of the external gear 32, the sliding resistance of the sliding bearing is significantly increased, which increases the loss of the power transmission, thereby further enhancing the overload preventive function or the reverse rotation preventive function.

Additionally, since the reduction gear mechanism is arranged around the output shaft made of metal, the output shaft as an essential (central) part of the apparatus can be accurately supported. This makes it possible to smoothly perform the usual power transmission with the output less than the rating output, and to keep the very stable output against the variation in the load of this level by reinforcement of the rigidity.

What is claimed is:

1. A reduction gear for business equipment, which has an internally meshing type planetary reduction gear mechanism in a casing, comprising:

an eccentric body rotated by an output of a motor;

an external gear made of a resin, which is rockingly rotated around said eccentric body;

an internal gear made of a resin, which is fixed on said casing and internally meshes with said external gear made of a resin;

component selective absorption means for absorbing the rocking component of said external gear and taking out only the rotational component of said external gear;

an output shaft connected to said external gear through said component selective absorption means, and which is formed of a metal having a rigidity higher than that of the resin forming said external gear and said internal gear;

a bearing disposed between said eccentric body and said external gear, and which is formed of a metal having a rigidity higher than that of the resin forming said external gear and said internal gear;

wherein said internal gear and external gear are elastically deformable such that as a load applied to said internal gear and external gear increases the elastic deformation of said internal gear and external gear increases and a number of teeth meshing is increased.

2. A reduction gear for business equipment according to claim 1, wherein said bearing between said eccentric body and said external gear is composed of a sliding bearing formed of a metal ring.

3. A reduction gear for business equipment according to claim 1, wherein said eccentric body is formed integrally with a gear for transmitting the output of a motor, and which is disposed around said output shaft.

4. A reduction gear for business equipment according to claim 2, wherein said eccentric body is formed integrally with a gear for transmitting the output of a motor, and which is disposed around said output shaft.

* * * * *